(12) United States Patent
Fredlund et al.

(10) Patent No.: US 7,483,061 B2
(45) Date of Patent: Jan. 27, 2009

(54) IMAGE AND AUDIO CAPTURE WITH MODE SELECTION

(75) Inventors: John R. Fredlund, Rochester, NY (US); Roland R. Schindler, II, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 675 days.

(21) Appl. No.: 11/235,042

(22) Filed: Sep. 26, 2005

(65) Prior Publication Data

US 2007/0081796 A1    Apr. 12, 2007

(51) Int. Cl.
H04N 5/76 (2006.01)
G03B 17/24 (2006.01)

(52) U.S. Cl. .................... 348/231.4; 396/312

(58) Field of Classification Search .............. 348/231.4; 396/312
See application file for complete search history.

(56) References Cited

U.S. PATENT DOCUMENTS

| | | | |
|---|---|---|---|
| 4,531,161 A | 7/1985 | Murakoshi | |
| 4,549,236 A | 10/1985 | Fujiki et al. | |
| 4,602,296 A | 7/1986 | Murakoshi | |
| 4,725,897 A | 2/1988 | Konishi | |
| 4,862,278 A | 8/1989 | Dann et al. | |
| 4,965,675 A | 10/1990 | Hori et al. | |
| 5,027,149 A | 6/1991 | Hoshino et al. | |
| 5,032,918 A | 7/1991 | Ota et al. | |
| 5,099,262 A | 3/1992 | Tanaka et al. | |
| 5,164,841 A | 11/1992 | Takahashi | |
| 5,276,472 A | 1/1994 | Bell et al. | |
| 5,335,072 A | 8/1994 | Tanaka et al. | |
| 5,546,145 A | 8/1996 | Bernardi et al. | |
| 5,867,628 A | 2/1999 | Sato et al. | |
| 5,930,452 A | 7/1999 | Wakui et al. | |
| 5,982,981 A | 11/1999 | Satoh | |
| 6,102,505 A | 8/2000 | McIntyre et al. | |
| 6,128,037 A | 10/2000 | Anderson | |
| 6,327,423 B1 | 12/2001 | Ejima et al. | |
| 6,334,027 B1 | 12/2001 | Fukuoka et al. | |
| 6,418,272 B1 | 7/2002 | Higashiyama | |
| 6,462,778 B1 | 10/2002 | Abram et al. | |
| 6,590,608 B2 | 7/2003 | Matsumoto et al. | |
| 6,687,453 B1 | 2/2004 | Sakamoto et al. | |
| 6,829,624 B2 * | 12/2004 | Yoshida | 707/205 |
| 6,931,201 B2 | 8/2005 | Obrador | |
| 7,113,219 B2 * | 9/2006 | Adams et al. | 348/374 |
| 2002/0036694 A1 | 3/2002 | Merril | |
| 2003/0035055 A1 | 2/2003 | Baron | |
| 2003/0174218 A1 * | 9/2003 | Battles et al. | 348/231.4 |

(Continued)

Primary Examiner—Justin P Misleh
(74) Attorney, Agent, or Firm—Ronald R. Schindler

(57) ABSTRACT

Image capture methods and devices are provided. The image capture device including: an image capture system; an audio capture system; a user input system having a manual mode selection input, said user input system generating a mode selection signal indicating a setting of the mode selection input from among a plurality of settings; and a controller adapted to cause the image capture unit to capture at least one image and further adapted to cause the audio capture system to capture an audio signal within an audio capture time frame beginning at a start time and ending at an end time with said controller further adapted to associate the captured image with the electronic audio signal; wherein said controller determines at least one of the start time and the end time determined based upon the mode selection.

22 Claims, 4 Drawing Sheets

U.S. PATENT DOCUMENTS

| | | |
|---|---|---|
| 2004/0041917 A1 | 3/2004 | Norcross et al. |
| 2004/0041922 A1 | 3/2004 | Norcross |
| 2004/0051809 A1 | 3/2004 | Adams et al. |
| 2004/0061788 A1 | 4/2004 | Bateman |
| 2004/0141062 A1 | 7/2004 | Pilu et al. |
| 2004/0201747 A1* | 10/2004 | Woods .................. 348/231.99 |
| 2006/0092291 A1* | 5/2006 | Bodie .................... 348/231.99 |

* cited by examiner

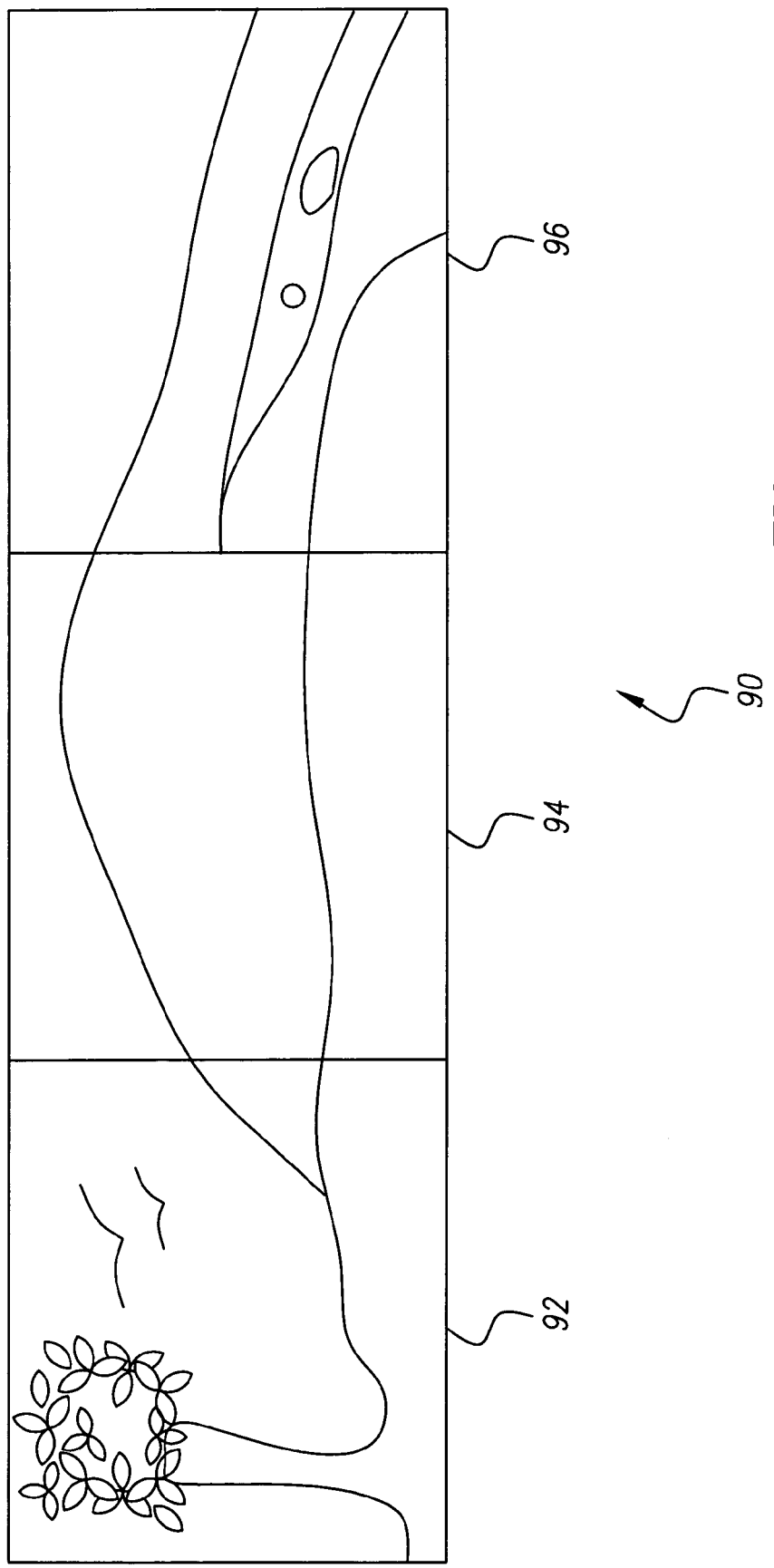

to conventional still photography, home movies and video. However, many of the resulting audio signals have not provided audio signals that are as useful as is necessary or desirable. This is in part because conventional systems do not provide an adjustable range of modes for audio capture.

IMAGE AND AUDIO CAPTURE WITH MODE SELECTION

FIELD OF THE INVENTION

The present invention relates to image and audio capture devices.

BACKGROUND OF THE INVENTION

There have been a many attempts to provide still image cameras that enhance still image picture taking by capturing audio signals during image capture and using the captured audio signals for various purposes such as camera control and annotation purposes. In commonly assigned U.S. Pat. No. 5,276,472 audio is recorded in a photographic film camera in association with individual exposed frames. In this patent the audio received by the camera is first digitized and stored in a temporary storage memory in the camera allowing playback through a speaker mounted in the camera to permit playback review and editing, as needed. When the film is advanced in the camera to the next exposure frame, the digital audio signal is recorded on a magnetic layer formed on the film. At the photofinisher, the digital audio signal is read and converted to suitable encodement format, such as bar code or binary coded blister marks which are impressed on the photo print for subsequent playback. In the '472 patent a switch is provided that a user activates to cause sounds to be recorded.

Many conventional digital cameras provide audio capture capabilities that are enabled only when such cameras are operated in a video image capture mode. Other conventional digital cameras provide no audio capture capability, or provide only one mode of image and audio capture.

U.S. Pat. No. 6,931,201 provides a method of presenting an image together with related sound comprising: capturing an image; capturing a passage of sound; capturing further information relating to the image; printing the image to form a printed image; writing the passage of sound on to an electronic storage device as sound information; further writing the further information on to the electronic storage device; fixing the electronic storage device to the printed image; and connecting one or more devices to the electronic storage device to enable, together or separately, the information defining the passage of sound to be transferred from the electronic storage device for reproduction as sound and the further information to be transferred from the electronic storage device for use. In '201 patent, it is noted that a camera useful in this method can be provided, with certain basic controls and displays including: means to start and stop recording and to associate a specific recording with a specific image, and preferably means to display when a given recording is in progress and means for sound playback. Optional features include recording audio that is synchronized with taking of a picture (starting or stopping at the point of image capture, or with image capture occurring at a predefined point during sound capture)—other conventional sound recording features (stereo, noise reduction etc.). However, it will be appreciated that the '201 patent provides no indication as to what the means to start and stop recording comprise, or what controls or means are provided to establish recording features for audio capture. Thus, there is a need in the art for an image capture device that is adapted to enable automatic audio capture in ways that are most useful for the kind of images being captured, particular image capture conditions, or particular uses for such audio signals.

SUMMARY OF THE INVENTION

In one aspect of the invention an image capture device is provided. The image capture device comprises: an image capture system having an optical system for focusing light onto an image capture sensor and image forming circuitry adapted to cooperate with the image capture sensor to convert the light focused onto the image capture sensor into an electronic image; an audio capture system having a transducer and audio processing circuitry adapted to cooperate to convert a pattern of sonic energy incident upon the transducer into an electronic audio signal representing the pattern of sonic energy; a user input system having a manual capture input and a manual mode selection input, the user input system generating a capture signal when the capture input is moved from a rest position to a capture position and the user input system generating a mode selection signal indicating a setting of the mode selection input from among a plurality of settings; and a controller adapted to cause the image capture system to capture at least one image in response to the capture signal and further adapted to cause the audio capture unit to capture an electronic audio signal representing the pattern of sonic energy incident upon the transducer within an audio capture time frame beginning at a start time and ending at an end time with the controller further adapted to associate the captured image with the electronic audio signal; wherein the controller determines at least one of the start time and the end time based upon the mode selection.

In another aspect of the invention, an image capture device is provided. The image capture system comprises an optical system for focusing light onto an image capture sensor and image forming circuitry adapted to cooperate with the image capture sensor to convert the light focused onto the image capture sensor into an electronic image; an audio capture system having a transducer and audio processing circuitry adapted to cooperate to convert a pattern of sonic energy incident upon the transducer into an electronic audio signal representative thereof; a user input system having a manual capture input and a manual mode selection input, the user input system generating a capture signal when the capture input is moved from a rest position to a capture position and the user input system generating a mode selection signal indicating a setting of the mode selection input from among a plurality of settings; and a controller adapted to cause the image capture system to capture an image when the capture signal is received and further adapted to cause the audio capture system to sample the electronic audio signal in accordance with one of at least two different sampling patterns each associated with a different one of the at least two image capture mode settings; wherein the controller selects the sampling pattern based upon the mode selection signal and wherein the controller begins sampling in accordance with the sampling pattern at a time determined based upon the time at which the capture signal is received.

In still another aspect of the invention, a method is provided for operating an image capture system and audio capture system. The method comprises the steps of: detecting a selection between at least two modes of image capture; determining at least one audio capture characteristic for providing an electronic audio signal based upon sounds detected by the audio capture device the determining being based upon the selected mode of image capture; capturing an image in accordance with the selected mode of image capture; providing an electronic audio signal based upon sounds detected by the audio capture system in accordance with the determined audio characteristic; and associating the captured image and electronic audio signal.

BRIEF DESCRIPTION OF THE DRAWINGS

FIG. 4 shows an illustration of a stitched panoramic image.

DETAILED DESCRIPTION OF THE INVENTION

Figure 1:
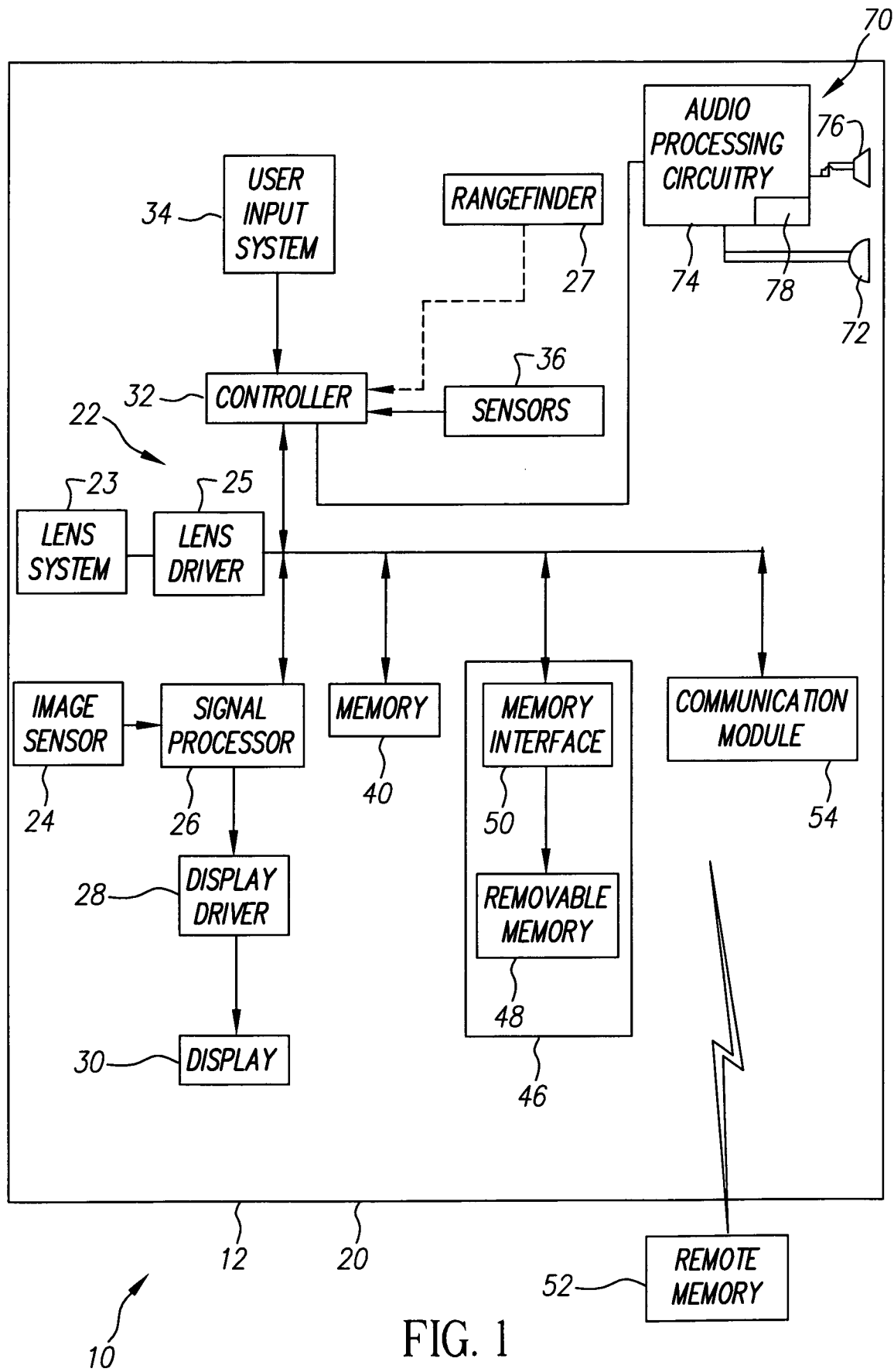
FIG. 1 shows a block diagram of one embodiment of an imaging system of the present invention.
Figure 2:
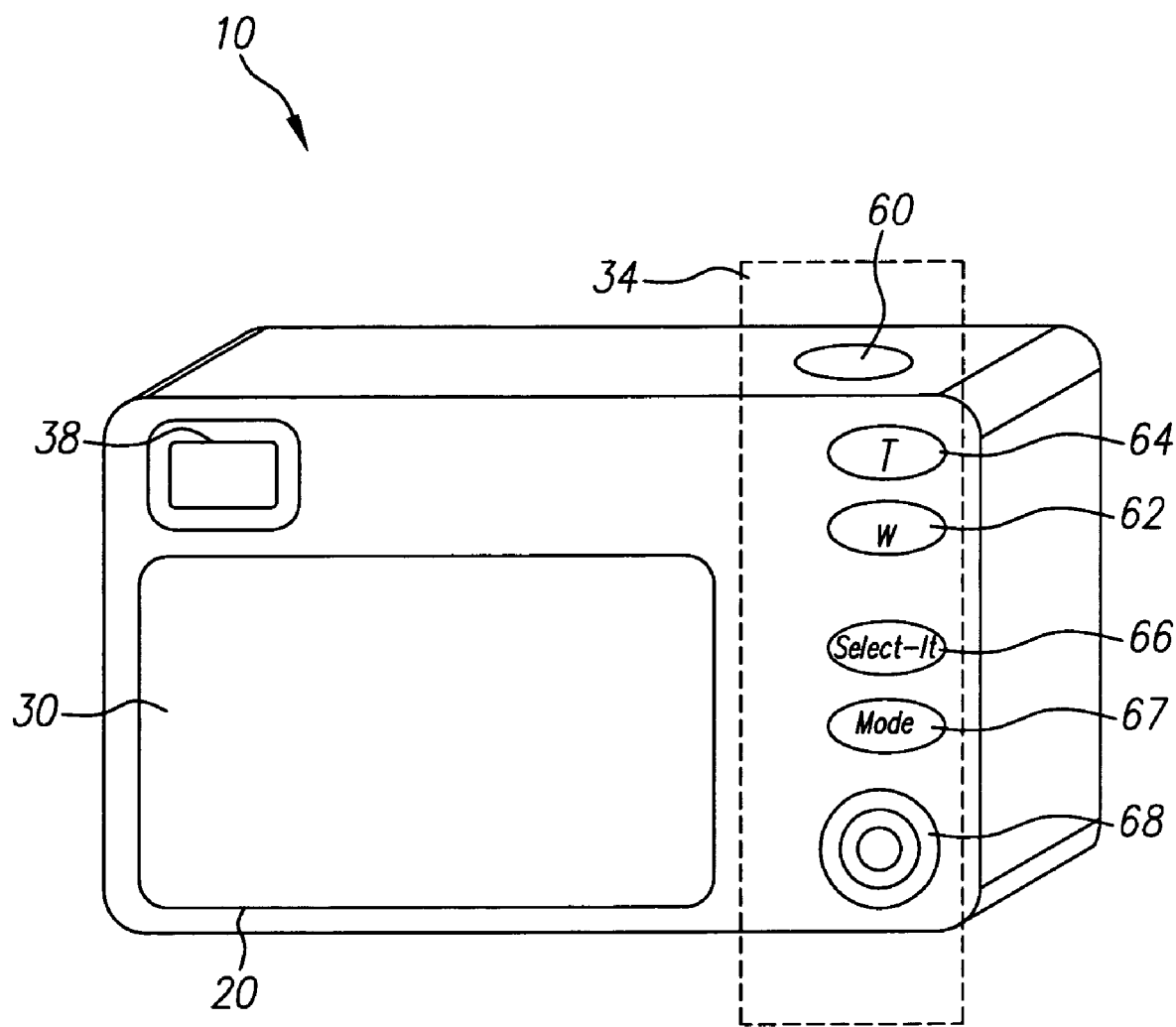
FIG. 2 shows a top, back, right side perspective view of one embodiment of the imaging system of FIG. 1.

FIG. 1 shows a block diagram of one embodiment of an image capture device 10 comprising a digital camera 12. FIG. 2 shows a top, back, right side perspective view of the image capture device 10 of FIG. 1. As is shown in FIGS. 1 and 2, image capture device 10 has a body 20 containing an image capture system 22 having a lens system 23, an image sensor 24, a signal processor 26, an optional display driver 28 and a display 30. In operation, light from a scene is focused by lens system 23 to form an image on image sensor 24. Lens system 23 can have one or more elements. Lens system 23 can be of a fixed focus type or can be manually or automatically adjustable. Lens system 23 is optionally adjustable to provide a variable zoom that can be varied manually or automatically. Lens system 23 optionally uses a lens driver 25, such as a motor arrangement to automatically move lens elements to provide an automatically adjustable zoom or focus. Other known arrangements can be used for lens system 23.

Light from the scene that is focused by lens system 23 onto image sensor 24 is converted into image signals representing an image of the scene. Image sensor 24 can comprise a charge coupled device (CCD), a complimentary metal oxide semiconductor (CMOS), or any other electronic image sensor known to those of ordinary skill in the art. The image signals can be in digital or analog form.

Signal processor 26 receives image signals from image sensor 24 and transforms the image signal into a digital image in the form of digital data. In the embodiment illustrated, signal processor 26 has an analog to digital conversion capability. Alternatively, a separate analog to digital converter (not shown) can be provided to convert the image signals into digital data which is then provided to signal processor 26. In this latter embodiment, signal processor 26 can comprise a digital signal processor adapted to convert the digital data into a digital image. The digital image can comprise one or more still images, multiple still images and/or a stream of apparently moving images such as a video segment. Where the digital image data comprises a stream of apparently moving images, the digital image data can comprise image data stored in an interleaved or interlaced image form, a sequence of still images, and/or other forms known to those of skill in the art of video.

Signal processor 26 can apply various image processing algorithms to the image signals when forming a digital image. These can include but are not limited to color and exposure balancing, interpolation and compression.

A controller 32 controls the operation the image capture device 10, including but not limited to image capture system 22, display 30 and memory such as memory 40 during imaging operations. Controller 32 causes image sensor 24, signal processor 26, memory 40 and display 30 to capture, process, store and display images in response to signals received from a user input system 34, data from signal processor 26 and data received from optional sensors 36. Controller 32 can comprise a microprocessor such as a programmable general purpose microprocessor, a dedicated micro-processor or microcontroller, or any other system that can be used to control operation of image capture device 10.

Controller 32 cooperates with a user input system 34 to allow image capture device 10 to interact with a user. User input system 34 can comprise any form of transducer or other device capable of receiving an input from a user and converting this input into a form that can be used by controller 32 in operating image capture device 10. For example, user input system 34 can comprise a touch screen input, a touch pad input, a 4-way switch, a 6-way switch, an 8-way switch, a stylus system, a trackball system, a joystick system, a voice recognition system, a gesture recognition system or other such systems. In the embodiment shown in FIGS. 1 and 2 user input system 34 includes a capture button 60 that sends a trigger signal to controller 32 indicating a desire to capture an image.

In the embodiment of image capture device 10 shown in FIGS. 1 and 2, user input system 34 also includes a wide-angle zoom button 62, and a tele zoom button 64 that cooperate with controller 32 to control the zoom settings of lens system 23 causing lens system 23 to zoom out when wide angle zoom button 62 is depressed and to zoom out when tele zoom button 64 is depressed. Wide-angle zoom lens button 62 and telephoto zoom button 64 can also be used to provide signals that cause signal processor 26 to process image signals so that the digital image formed thereby appears to have been captured at a different zoom setting than that actually provided by the optical lens system. This can be done by using a subset of the image signal and interpolating that subset of the image signal to form the digital image. User input system 34 can also include other buttons including joystick 66 shown in FIG. 2, the mode select button 67 and select-it button 68 shown in FIG. 2, the function of which will be described in greater detail below.

Sensors 36 are optional and can include light sensors, position sensors and other sensors known in the art that can be used to detect conditions in the environment surrounding image capture device 10 and to convert this information into a form that can be used by controller 32 in governing operation of image capture device 10. An optional rangefinder 27 can also be used to detect conditions such as distance to subject. Sensors 36 can also include biometric sensors adapted to detect characteristics of a user for security and affective imaging purposes.

Controller 32 causes an image signal and corresponding digital image to be formed when a trigger condition is detected. Typically, the trigger condition occurs when a user depresses capture button 60, however, controller 32 can determine that a trigger condition exists at a particular time, or at a particular time after capture button 60 is depressed. Alternatively, controller 32 can determine that a trigger condition exists when optional sensors 36 detect certain environmental conditions such as a pulse of infra red light.

Controller 32 can also be used to generate metadata in association with each image. Metadata is data that is related to a digital image or a portion of a digital image but that is not necessarily observable in the image data itself. In this regard, controller 32 can receive signals from signal processor 26, camera user input system 34, and other sensors 36 and, optionally, generates metadata based upon such signals. The metadata can include but is not limited to information such as the time and date that the archival image was captured, the type of image sensor 24, mode setting information, integration time information, taking lens unit setting information that characterizes the process used to capture the archival image and processes, methods and algorithms used by image capture device 10 to form the archival image. The metadata can also include but is not limited to any other information determined by controller 32 or stored in any memory in image capture device 10 such as information that identifies image capture device 10, and/or instructions for rendering or otherwise processing the digital image with which the metadata is associated. The metadata can also comprise an instruction to incorporate a particular message into a digital image when presented. Such a message can be a text message to be rendered when the digital image is presented or rendered. The metadata can also include audio signals. The metadata can further include digital image data. The metadata can also include any other information entered into image capture device 10.

The digital images and optional metadata can be stored in a compressed form. For example where the digital image comprises a sequence of still images, the still images can be stored in a compressed form such as by using the JPEG (Joint Photographic Experts Group) ISO 10918-1 (ITU-T.81) standard. This JPEG compressed image data is stored using the so-called "Exif" image format defined in the Exchangeable Image File Format version 2.2 published by the Japan Electronics and Information Technology Industries Association JEITA CP-3451. Similarly, other compression systems such as the MPEG-4 (Motion Pictures Export Group) or Apple Quicktime™ standard can be used to store digital images that are in a video form. Other image compression and storage forms can be used. Controller 32 will also typically be adapted to use, process, edit and store metadata that is provided with images that are not captured by image capture device 10.

The digital images and metadata can be stored in a memory such as memory 40. Memory 40 can include conventional memory devices including solid state, magnetic, optical or other data storage devices. Memory 40 can be fixed within image capture device 10 or it can be removable. In the embodiment of FIG. 1, image capture device 10 is shown having a memory card slot 46 that holds a removable memory 48 such as a removable memory card and has a removable memory interface 50 for communicating with removable memory 48. The digital images and metadata can also be stored in a remote memory system 52 that is external to image capture device 10 such as a personal computer, computer network or other imaging system.

In the embodiment shown in FIGS. 1 and 2, image capture device 10 has a communication module 54 for communicating with the remote memory system. The communication module 54 can be for example, an optical, radio frequency or other transducer that converts image and other data into a form that can be conveyed to the remote imaging system by way of an optical signal, radio frequency signal or other form of signal. Communication module 54 can also be used to receive a digital image and other information from a host computer or network (not shown). Controller 32 can also receive information and instructions from signals received by communication module 54 including but not limited to, signals from a remote control device (not shown) such as a remote trigger button (not shown) and can operate image capture device 10 in accordance with such signals. Communication module 54 can be an integral component of imaging capture device 10 as illustrated in FIG. 1 or it can be a component that is attached thereto, such as a card that can be inserted into image capture device 10 or otherwise attached thereto. One example of such a card is the Kodak WI-FI card that enables communication using an Institute of Electrical and Electronics Engineering 802.11 (b) standard and that is sold by Eastman Kodak Company, Rochester, N.Y., USA.

Signal processor 26 optionally also uses image signals or the digital images to form evaluation images which have an appearance that corresponds to captured image data and are adapted for presentation on display 30. This allows users of image capture device 10 to observe digital images that are available in image capture device 10 for example images that have been captured by image capture system 22, that are otherwise stored in a memory such as memory 40, removable memory 48 or that are received by way of communication module 54. Display 30 can comprise, for example, a color liquid crystal display (LCD), organic light emitting display (OLED) also known as an organic electroluminescent display (OELD) or other type of video display. Display 30 can be external as is shown in FIG. 2, or it can be internal for example used in a viewfinder system 38. Alternatively, image capture device 10 can have more than one display with, for example, one being external and one internal.

Signal processor 26 and controller 32 also cooperate to generate other images such as text, graphics, icons and other information for presentation on display 30 that can allow interactive communication between controller 32 and a user of image capture device 10, with display 30 providing information to the user of image capture device 10 and the user of image capture device 10 using user input system 34 to interactively provide information to image capture device 10. Image capture device 10 can also have other displays such as a segmented LCD or LED display (not shown) which can also permit signal processor 26 and/or controller 32 to provide information to a user 10. This capability is used for a variety of purposes such as establishing modes of operation, entering control settings, user preferences, and providing warnings and instructions to a user of image capture device 10. Other systems such as known systems and actuators for generating audio signals, vibrations, haptic feedback and other forms of signals can also be incorporated into image capture device 10 for use in providing information, feedback and warnings to the user of image capture device 10.

Typically, display 30 has less imaging resolution than image sensor 24. Accordingly, signal processor 26 reduces the resolution of image signal or digital image when forming evaluation images adapted for presentation on display 30. Down sampling and other conventional techniques for reducing the overall imaging resolution can be used. For example, resampling techniques such as are described in commonly assigned U.S. Pat. No. 5,164,831 "Electronic Still Camera Providing Multi-Format Storage Of Full And Reduced Resolution Images" filed by Kuchta et al., on Mar. 15, 1990, can be used. The evaluation images can optionally be stored in a memory such as memory 40. The evaluation images can be adapted to be provided to an optional display driver 28 that can be used to drive display 30. Alternatively, the evaluation images can be converted into signals that can be transmitted by signal processor 26 in a form that directly causes display 30 to present the evaluation images. Where this is done, display driver 28 can be omitted.

Image capture device 10 captures digital images using image sensor 24 and other components of image capture system 22 described above. Imaging operations that can be used to capture digital images include a capture process and can optionally also include a composition process and a verification process.

During the optional composition process, controller 32 causes signal processor 26 to cooperate with image sensor 24 to capture digital images and present a corresponding evaluation images on display 30. In the embodiment shown in FIGS. 1 and 2, controller 32 enters the image composition phase when capture button 60 is moved to a half depression position. However, other methods for determining when to enter a composition phase can be used. For example, one of user input system 34, for example, mode select button 67 shown in FIG. 2 can be depressed by a user of image capture device 10, and can be interpreted by controller 32 as an instruction to enter the composition phase. The evaluation images presented during composition can help a user to compose the scene for the capture of digital images.

The capture process is executed in response to controller 32 determining that a trigger condition exists. In the embodiment of FIGS. 1 and 2, a trigger signal is generated when capture button 60 is moved to a full depression condition and controller 32 determines that a trigger condition exists when controller 32 detects the trigger signal. During the capture process, controller 32 sends a capture signal causing signal processor 26 to obtain image signals from image sensor 24 and to process the image signals to form digital image data comprising a digital image. An evaluation image corresponding to the digital image is optionally formed for presentation on display 30 by signal processor 26 based upon the image signal. In one alternative embodiment, signal processor 26 converts each image signal into a digital image and then derives the evaluation image from the digital image.

During the verification process, the corresponding evaluation image is supplied to display 30 and is presented for a period of time. This permits a user to verify that the digital image has a preferred appearance.

Digital images can also be received by image capture device 10 in ways other than image capture. For example, digital images can be conveyed to image capture device 10 when such images are recorded on a removable memory that is inserted into memory interface 50. Alternatively digital images can be received by way of communication module 54. For example, where communication module 54 is adapted to communicate by way of a cellular telephone network, communication module 54 can be associated with a cellular telephone number or other identifying number that for example another user of the cellular telephone network such as the user of a telephone equipped with a digital camera can use to establish a communication link with image capture device 10 and transmit images which can be received by communication module 54.

As shown in FIGS. 1 and 2, user input system 36 of image capture device 20 can provide a variety of user input controls including capture button 60, a tele-zoom setting input 62, a wide-angle zoom setting input 64, a select-it input 66 and a mode select switch 67 and a joystick 68. Controller 32 is adapted to increase and decrease the effective zoom ratio of the image capture system in response to signals received from tele-zoom setting input 62 and wide-angle zoom setting input 64.

Mode select switch 67 is used to allow a photographer to manually select one of a set of possible image capture modes for capturing images using image capture device 10. In the embodiment illustrated in FIG. 2, the user input provides a plurality of different image capture modes including an automatic mode wherein the image capture settings used for capturing an image are determined automatically by controller 32, a manual mode wherein the settings used for capturing an image are determined based user inputs and/or preferences, an action mode wherein images are captured using image capture settings that are optimized for the capture of rapidly changing scenes, and a portrait mode wherein controller 32 causes images to be captured using image capture settings that are optimized for image capture of a generally still scene.

Controller 32 is also adapted to use signals from joystick 68 to allow a user to make input for use in navigating images presented on a display and for making decisions.

In the embodiments of FIGS. 1 and 2, imaging capture device 10 has an audio capture system 70 having an input transducer in the form of a microphone 72 that receives sonic energy and generates signals that are provided to audio processing circuitry 74. Audio processing circuitry 74 is adapted to convert the signals received from microphone 72 into an electronic audio signal representing the pattern of sonic energy incident upon the transducer. Audio processing circuitry 74 is further adapted to receive signals from controller 32 and to cause speaker 76 to generate audible sounds.

Typically, mode selection switch 67 directs image capture device 10 to capture images in a particular manner. For example, in the landscape mode, an optional flash system (not shown) is disabled and lens system 23 is focused to infinity in anticipation of a photograph of distant scenery. In the sports mode, image capture system 22 is set to the fastest capture setting possible with the available light since the image will likely be comprising fast moving athletes and objects. In the video mode, a stream of image information, such as a set of multiple images is captured along with audio.

In accordance with the present invention, mode selection can be used to go beyond selection of setup of image capture parameters of image capture device 10. Controller 32 is operable to cause audio capture system 70 to capture audio for association with captured images based upon the image capture mode selector.

Figure 3:
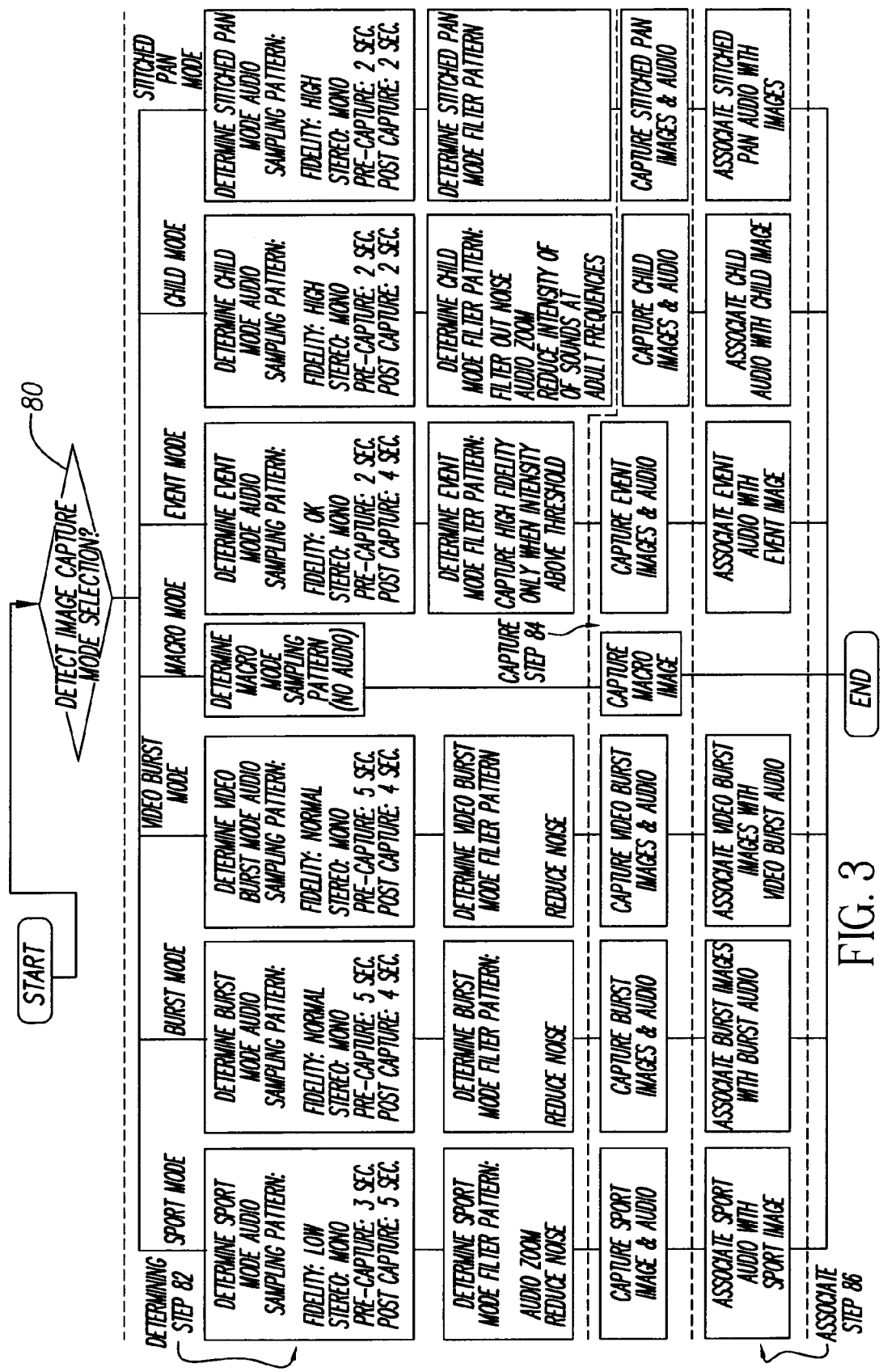
FIG. 3 shows one embodiment of a method for operating the imaging system of FIG. 2.

FIG. 3 shows one embodiment of a method for operating image capture device 10 of FIGS. 1 and 2. As illustrated in FIG. 3, a first step of the method occurs when controller 32 determines that an image capture mode selection has been made (step 80). Image capture device 10 is operable in at least two modes and each mode is associated with audio capture characteristics that are to be used by controller 32 and/or audio capture system 70 for capturing an electronic audio signal when image capture device 10 is in the selected image capture mode.

The mode selection determination is typically based upon a user's interaction with user input system 34. For example, as shown in FIG. 2, user input system 34 includes a mode select switch 67 and a select it button 68. In one embodiment, the mode select switch 67 can be depressed sending signals to controller 32 that cause controller 32 to present a sequence of the more than one image capture mode options on display 30. When a desired mode appears the user can depress select-it button 68 to indicate a selected mode of operation.

In another embodiment, a multi-position switch (not shown) can be provided that is settable at a number of settings indicated by icons 100, 102, 104, 106 and 108. In this embodiment, controller 32 is adapted to determine an image capture mode selection based upon the settings of this switch. In still another embodiment of the invention controller 32 and/or signal processor 26 can be adapted to capture temporary images of a scene and to automatically select a proposed image capture mode to be used for capturing an image of the scene based upon analysis of the temporary images.

In the embodiment of image capture device 10 that is illustrated in FIGS. 2 and 3, image capture device 10 is operable in six modes, a sport mode, a conventional burst mode, a video burst mode, a macro (close-up) mode, an event mode and a child mode. Controller 32 detects when a user makes the selection of mode. Controller 32 then determines at least one audio capture characteristic for providing an electronic audio signal based upon sounds detected by audio capture system 70 (step 82).

As is illustrated in the embodiment of FIG. 3, determining step (step 82) involves determining audio characteristics for providing an electronic audio signal based upon the selected audio capture mode. Typically these characteristics will be pre-programmed into image capture device 10 and stored in memory 40 when image capture device 10 is manufactured. The characteristics are intended to allow controller 32 and audio capture system 70 to generate audio data that is well suited for the types of images being captured, for the use that users typically make of such images, and for the circumstances that a user confronts when capturing such images. Optionally, these characteristics can be adjustable or programmable by a user. Such a user can make adjustments thereto using user input system 34 or by downloading pre-programmed settings from a source such as an electronic memory or a computer network or telecommunications network.

For example, in the embodiment of FIG. 3, when controller 32 detects signals indicating that a sport mode is selected, controller 32 determines from memory 40 that a low fidelity, monaural sound file is to be captured corresponding to each captured sport image. The low fidelity audio mode used in the sport mode is considered to be sufficient for a sport mode photo since such audio is captured merely for providing a feeling of excitement or the ambiance of the event. Low fidelity audio can also be used where the capacity of memory 40 is of concern, or where the size of the audio data file is of concern for other reasons such as simplifying the act of sharing the audio data file, so as not to use memory inefficiently or to unnecessarily make the storing or sharing images more inconvenient. Controller 32 can determine a sampling pattern for capturing such audio that can include rates of sampling, or bit-depth for sampling based upon the fidelity setting.

Controller 32 can also determine a start and stop time for sampling audio relative to the time of capture of the sport mode images. In this example, the start time includes 3 seconds of pre-capture audio which is audio captured immediately proximate to the capture of the sport mode image and 5 seconds of post-capture audio that includes audio captured within five seconds after the moment of capture of the sport mode image. Importantly, the user is not encumbered with the task of manually adjusting settings of the image capture device to configure image capture device 10 for audio capture in this way.

In the embodiment of FIGS. 1-3, image capture device 10 is optionally adapted to capture buffer audio signals and to store these in electronic form in a buffer. The buffer can comprise a local memory 78 within audio capture system 70 that is capable of storing a limited duration of high quality or other quality audio data in a first-in/first-out (FIFO) arrangement such that audio data will be available for a given period of time prior to a present moment. Alternatively, controller 32 and memory 40 can be used to cooperate with audio capture system 70 to create such a FIFO buffer of buffer audio data in memory 40 or elsewhere such as a remote memory 52.

Controller 32 can selectively extract pre-capture audio data from such a FIFO buffer to satisfy any need for pre-capture audio data that reflects sounds incident at audio capture system 70 at times prior to a moment of image capture as called for in the determined characteristics. Such audio is referred to herein as pre-capture audio. Similarly, where advantageous, post-capture audio can also be obtained from a FIFO buffer to the extent that the FIFO buffer continues to operate after capture. Alternatively, post capture audio can be captured directly in accordance with the determined characteristics. Once again, the user is not encumbered with the task of manually adjusting settings of the image capture device to configure the image capture device for audio capture in this way.

In the embodiment of FIGS. 1-3, an audio filter pattern is also determined as a part of determining audio characteristics (step 82). Specifically, the audio filter pattern provides controller 32 with instructions for ensuring that the audio data that is captured has desired audio content. Specifically, in the sport mode, controller 32 determines that an audio zoom is to be applied to the image and that a noise reduction algorithm is to be applied.

The so-called audio zoom capability instructs controller 32 to take steps to ensure that the content of the electronic audio signal fairly represents audio conditions at a point of zoom of image capture system 22. In one aspect of the invention the audio zoom can be electromechanical in nature with image capture device 10 providing a system for focusing audio signals from the field of view of lens system 23 onto microphone 72. One example of such an audio zoom system is described in commonly assigned U.S. Pat. No. 4,862,278, entitled "Video Camera Microphone with Zoom Variable Acoustic Focus", filed by Dann et al. on Oct. 14, 1986. Digital processing of the audio signal can also be used to provide similar effects, for example, to normalize or reduce the intensity of sounds emanating from sources close to the image capture device 10 so as to increase the apparent intensity of sounds emanating from sources closer to the field of view of image capture system 22.

Noise reduction algorithms are well known and are adapted to exclude or to de-emphasize ambient, extraneous, incidental or environmental sounds that are not of interest to the user of image capture device 10. Examples of sounds that can be excluded by noise reduction algorithms include algorithms adapted to exclude the sound of wind against microphone 72, the sounds of image capture device focusing equipment or motors, or the sounds of jostling of image capture device 10.

In this manner, a set of characteristics is automatically provided for capturing sport audio that is optimized to the captured sport image. For example, if the sport image is intended to capture the image of a basketball player making a basket, the image will be at or near the time of the basketball going through the hoop and the audio will be of the noise of the athletes 3 seconds before the shot and the cheer of the crowd after the ball goes into the basket. The capture of the cheer can be accomplished by continuing to record sound for a predetermined amount of time after capture or by detecting a rise and fall of the volume of the audio signal. The cheer is typified as a rise and fall of volume and, as such, the cheer can be captured by determining this volume pattern.

Once that such audio capture settings are determined a sport image and sport audio are captured (step 84). The capture process can include post capture processing where, for example, the captured sport image and sport audio are processed as desired in accordance with any image capture characteristics particular to the selected mode and the audio characteristics. For example, capture of the sport audio could be made in high fidelity with post processing being used to sample, compress or otherwise convert the high-fidelity captured audio into a smaller, more useful or more convenient low fidelity form.

The sport image and the sport audio are then associated (step 84). There are a variety of ways to do this. In one embodiment, this is done by creating a single data file containing both the sport image and the sport audio. This approach ensures that the sport image and the sport audio data remain together. However, other approaches are equally viable and can include, for example, storing metadata such as a pointer or marker in the captured sport image that directs the user to a storage area where the captured sport audio data is stored and can also include storing the sport image and audio image in a common database, data file, file server, or web site.

As is also shown in FIG. 3, image capture device 10 is also operable two burst modes, a conventional burst mode and a video burst mode. In the conventional burst mode a user of image capture device 10 can press and hold capture button 60 in a capture position over a period of time during which controller 32 will cause sequence of images to be captured to images being captured at predefined rate. Often, this predefined rate will be at a high rate of image capture. This allows a sequence of still images to be captured over a period of time so that a photographer will have a set of images representing the event. In some embodiments, the photographer will select one of the images and the rest will be discarded. In other embodiments, the entire sequence of burst images can be captured and stored. Thus, using a conventional burst mode, a photographer is provided with the ability to capture images at a much greater rate than the photographer could capture images in the event that the photographer had to depress capture button 60 for each captured image however, the photographer sacrifices the ability to decide the exact moment of image capture. Accordingly, conventional burst mode captured images may not include an image capture at a particularly desirable moment.

When a selection of a conventional burst mode is detected (step 80), controller 32 determines audio capture characteristics associated with the burst mode, for example, from memory 40. In the embodiment of FIG. 3, controller 32 determines that the audio characteristics for the burst mode include normal audio fidelity and monaural sound capture. Controller 32 also determines that audio capture is to begin five seconds before the start of burst image capture and is to continue for four seconds after all of the images in the burst group have been captured. Optionally, the burst audio can be stored as a buffer audio signal. Finally, controller 32 determines a burst mode filter pattern for use in filtering the captured audio signal. In this embodiment, the burst mode filter pattern calls for the application of a noise reduction algorithm as described generally above.

A set of burst images and burst audio are then captured in accordance with the audio characteristics (step 84) and an association is then made between at least one of the burst images and at least a portion of the burst audio (step 86). There are a variety of ways in which this can be done. In an embodiment, where only one of the burst images is saved and the rest are discarded, controller 32 can cause all of the burst audio to be associated with the saved burst image. In other embodiments of this type, a portion of the burst audio can be stored with the saved burst image. The portion can be automatically selected to be that portion of the burst audio that was captured proximate to the single saved image such as, in this embodiment, burst audio capture within 4 seconds before the capture of the single saved image and audio information captured within five seconds after the capture of the single saved image. Other arrangements are possible. As is noted above, there are a wide variety of ways in which such in association between burst image(s) and burst audio can be made.

For example, where more than one of the burst images are saved, the entire burst audio can be stored or otherwise associated with each of the saved images. Alternatively, where more than one of the burst images are saved, the burst audio can be segmented to provide audio that was captured proximate to the time of capture each saved image and to associate each portion of the audio with the saved burst image corresponding thereto. Here too, such associations can be made in any of the manners described above.

As is also shown in FIG. 3, in the video burst mode, controller 32 causes a stream of video information to be captured during a period of time that is determined based upon a period of time during which a user of image capture device 10 holds capture button 60 in a capture position and burst audio is captured in accordance with the video burst. Controller 32 optionally, in cooperation with signal processor 26, will then cause selected still images to be formed based upon the captured video. For this purpose, the captured video information can be stored in a local buffer in image capture system 22 or in a memory such as memory 40.

However, instead of selecting particular ones of the images portions of the video stream for use in forming still images based upon a predetermined formulation, such as may occur in the aforementioned conventional burst mode, controller 32 analyzes the burst audio captured in this mode. This analysis is then used to determine when a level of sound in the environment surrounding image capture device 10 reaches a threshold level above an ambient level. Controller 32 then causes proportionately more still images per unit of time to be extracted when such sound levels are at or above the threshold. In one embodiment the determination of when to extract a higher proportion of still images from video stream can be made based upon the idea that such increases in the intensity of sounds made by the spectators will typically occur after a reaction time has passed since the occurrence of the actual event. Accordingly, proportionately more burst images can be extracted from the video stream per unit of time during a period of time that begins at a point in time determined by detecting when sound intensity increases above the threshold and applying a reaction time offset to the detected point in time of the sound intensity increase. In these ways, image capture device 10 can use the burst audio to help the selection of burst images from video stream. This increases the likelihood of automatically extracting images of greater interest. It will also be appreciated that this method can be applied toward selecting individual ones of still images from a set of still images captured in the conventional burst mode. The still images captured in this manner and burst audio can be associated, as described above, with respect to the conventional burst mode (step 84).

In another embodiment of a video burst mode, image capture device 10 can capture a set of high-resolution still images and burst audio as described above. Additionally, lower resolution evaluation images of the type used during scene composition and verification can be captured and stored. These evaluation images can then be associated with the high-resolution still images and captured burst audio. This can help to resolve the problems of capturing images at the exact moment of the event because the recorded and stored evaluation images can be combined with captured still images to allow controller 32 and signal processor 26 to generate high quality images at exact moments in time without imposing the memory requirements of capturing and storing a high resolution video stream. Here too, the burst audio can be associated with any of the captured high-resolution images, the evaluation images, or images that are generated based upon combinations thereof.

As is also shown in FIG. 3, image capture device 10 is also operable in an "event" mode for use in situations where low levels of ambient noise may be continuously present such as at conferences, parties, social gatherings and the like. In such circumstances it is unlikely that such low-level background audio is of much value. When controller 32 detects that an event mode has been selected (step 80), controller 32 will determine audio capture characteristics (step 82) that are appropriate for such conditions so that any sequences detected with audio below a certain threshold can be recorded in a manner that minimizes the amount of memory required to store such audio. For example, as shown in FIG. 3, the audio fidelity is adjustable so that only when a voice or voices are raised above the threshold the fidelity of the event audio will be higher to provide better quality, otherwise a lower level of fidelity will be provided. The event image and event audio are then captured (step 84) and associated (step 86). This mode may be particularly useful in applications where transmission of images and audio is desired, but the bandwidth of the channel for transmission is limited.

In still another example, when controller 32 detects signals indicating that a user has selected a child mode for capturing images of children, such as provided in the Kodak EasyShare One camera, a high fidelity audio mode can be selected as the fidelity of the sounds made by a small child is often important to a user. Accordingly, as shown in FIG. 3, when controller 32 determines the audio characteristics for use in the child mode, high fidelity stereo audio is determined with two second pre-capture and four second post-capture. Further, a variety of audio filter characteristics are provided, including audio zoom, noise reduction, and a filtering to reduce the intensity of sounds made at adult voice frequencies. Thus when the mode for children is selected, image capture device 10 will use the memory required to store higher fidelity audio or process the audio in such a way that the audio associated with sounds made by small children is captured (step 84) and associated with the image (step 86).

When a stitched panoramic capture mode has been selected, audio may be captured that enables an improved viewing scenario. In particular, if the audio capture has a directional capability as previously described for audio zoom, a particular audio segment can be played when a particular portion of the image is viewed.

FIG. 4 shows a stitched panoramic image 90 with segments 92, 94, and 96. Each segment corresponds to an individual captured image. The visual content of first segment 92 is a tree with birds. The visual content of second segment 94 is a distant mountain range, and the visual content of third segment 96 is a rapidly flowing stream cascading down a rocky path. When the stitched panoramic mode is selected, an audio segment of predetermined length is captured for each of the captured images. In playback, when the stitched image pans across the screen, the appropriate audio segment is played. Alternatively, when the entire image is viewed at once, the audio played corresponds to the segment being indicated with a pointing device such as a mouse or touch screen, or alternatively, a combination of sound can be played.

Finally, it will be appreciated that in other modes, such as a macro or close-up mode, there may be limited benefits to capturing audio. Accordingly, when such modes are selected, controller 32 can determine (step 82) that no audio is to be captured. Where such a determination is made only an image is captured (step 84) and the step of associating can be omitted as shown or can involve simply storing metadata in association with the captured image indicating that no audio was captured in association therewith.

The invention has been described in detail with particular reference to certain preferred embodiments thereof, but it will be understood that variations and modifications can be effected within the spirit and scope of the invention.

PARTS LIST

- 10 image capture device
- 20 body
- 22 image capture system
- 23 lens system
- 24 image sensor
- 25 lens driver
- 26 signal processor
- 27 rangefinder
- 28 display driver
- 30 display
- 32 controller
- 34 user input system
- 36 sensors
- 40 memory
- 46 memory card slot
- 48 removable memory card
- 50 memory interface
- 52 remote memory system
- 54 communication module
- 60 capture button
- 62 wide-angle zoom button
- 64 tele-zoom button
- 66 joystick
- 67 mode select button
- 68 select-it button
- 70 audio capture system
- 72 microphone
- 74 audio processing circuitry
- 76 speaker
- 78 local memory
- 80 mode determining step
- 82 determine characteristic step
- 84 capture step
- 86 associate step
- 90 stitched panoramic image
- 92 first segment
- 94 second segment
- 96 third segment

The invention claimed is:

1. An image capture device comprising:

an image capture system having an optical system for focusing light onto an image capture sensor and image forming circuitry cooperating with the image capture sensor to convert the light focused onto the image capture sensor into an electronic image;

an audio capture system having a transducer and audio processing circuitry cooperating to convert a pattern of sonic energy incident upon the transducer into an electronic audio signal representing the pattern of sonic energy;

a user input system having a manual capture input and a manual mode selection input, said user input system generating a capture signal when the capture input is moved from a rest position to a capture position and said user input system generating a mode selection signal indicating a setting of the mode selection input from among a plurality of settings; and a controller causing the image capture system to capture at least one image in response to the capture signal and further causing the audio capture system to capture an electronic audio signal representing the pattern of sonic energy incident upon the transducer within an audio capture time frame beginning at a start time and ending at an end time with said controller further associating the captured image with the electronic audio signal;

wherein said controller determines at least one of the start time and the end time based upon the mode selection.

2. The image capture device of claim 1, wherein said controller determines at least one of the start time and the end time based upon an offset time relative to a time of image capture with the offset time being determined based upon the mode selection and wherein the controller uses a first offset time when the mode selection input is positioned at a first setting and wherein the controller uses a second offset time when the mode selection input is positioned at a second setting, said second offset time being different than said first offset time.

3. The image capture device of claim 1, wherein the controller is further allowing an image to be captured without capturing an electronic audio signal when the controller determines that the mode selection input is set to a third setting.

4. The image capture device of claim 1, wherein said audio capture system comprises an electronic audio signal buffer storing a buffer audio signal in a first in first out buffer over a period of time and wherein the controller is causing the audio capture system to store audio signals in the buffer at start time determined by the mode selection.

5. The image capture device of claim 1, wherein said capture button has a position intermediate said rest position and said capture position, with the controller receiving a signal when the capture button is so positioned and wherein in at least one mode, the controller causes the audio capture system to store electronic audio signals beginning at a time before the capture button is moved to the intermediate position.

6. The image capture device of claim 1, wherein said capture button has a position intermediate said rest position and said capture position, with the controller receiving a signal when the capture button is so positioned and wherein in at least one mode, the controller causes said audio capture system to store electronic audio signals from the start time up to a time that occurs after the capture button has been allowed to return to either the intermediate position or the rest position after an image has been captured.

7. The image capture device of claim 1, further comprising an electronic audio signal buffer storing a buffer audio signal in a first in first out buffer over a period of time and wherein the controller is selectively obtaining the electronic audio signal from the data in the buffer in accordance with the start and end time.

8. The image capture device of claim 1, wherein said processor is adapted in one of said image capture modes to selectively filter at least one of the sounds reaching the audio transducer, the signals provided by the audio transducer, a buffer audio signal, or the electronic audio signal to provide an electronic audio signal that has reduced intensity of sounds emanating from locations close to the image capture device while maintaining or increasing the intensity of sounds emanating at a determined distance from the image capture device.

9. The image capture device of claim 8, wherein said one of said image capture mode settings is sport mode wherein an audio zoom effect is applied during audio capture or processing of audio captured in the sport mode.

10. The image capture device of claim 1, wherein said controller is adapted in one mode to cause the image capture system to capture a set of images at or about the time that the capture signal is received wherein said audio capture system comprises an electronic audio signal buffer storing a buffer audio signal in a first in first out buffer over a period of time and wherein the controller is causing the audio capture system to store the buffer audio signals in the buffer at a start time or at an end time that correspond to a point in time where the set of captured images is captured.

11. The image capture device of claim 1, wherein said capture input and said mode selection input comprise a combined capture and mode selection input movable from a rest position to a capture with audio position with a capture without audio position interposed therebetween and to generate an image capture signal indicative of the position of the capture button.

12. The image capture device of claim 10, wherein the controller is capturing said set of images, at least in part, by capturing video signals and extracting still images from the video signals.

13. The image capture device of claim 12, wherein said controller is further analyzing said captured electronic audio signal to determine, at least in part, which images are to be extracted from the video stream based upon the analysis of the captured audio signals.

14. An image capture device comprising:
an image capture system having an optical system for focusing light onto an image capture sensor and image forming circuitry cooperating with the image capture sensor to convert the light focused onto the image capture sensor into an electronic image;
an audio capture system having a transducer and audio processing circuitry cooperating to convert a pattern of sonic energy incident upon the transducer into an electronic audio signal representative thereof;
a user input system having a manual capture input and a manual mode selection input, said user input system generating a capture signal when the capture input is moved from a rest position to a capture position and said user input system generating a mode selection signal indicating a setting of the mode selection input from among a plurality of settings; and
a controller causing the image capture system to capture an image when the capture signal is received and further causing the audio capture system to sample the sonic energy incident upon the transducer to form an electronic audio signal in accordance with one of at least two different sampling patterns each associated with a different one of the at least two image capture mode settings;
wherein the controller selects the sampling pattern based upon the mode selection signal and wherein the controller begins sampling in accordance with the sampling pattern at a time determined based upon the time at which the capture signal is received.

15. The image capture device of claim 14, wherein said audio capture system stores a buffer audio signal in a buffer and wherein the sampling pattern is used to form an electronic audio signal from the buffer audio signal.

16. The image capture device of claim 14, wherein said audio capture system is executing the process of converting sonic energy into the electronic audio signal in accordance with the selected sampling pattern.

17. The image capture device of claim 14, wherein at least one of said sampling patterns is adapted so that the intensity of sounds made by the camera and/or the photographer during image composition is reduced in the electronic audio signal.

18. A method for operating an image capture system and audio capture system, the method comprising the steps of:
detecting a selection between at least two modes of image capture;

determining at least one audio capture characteristic for providing an electronic audio signal based upon sounds detected by the audio capture system said determining being based upon the selected mode of image capture;

capturing an image in accordance with the selected mode of image capture;

providing an electronic audio signal based upon sounds detected by that audio capture system and in accordance with the determined audio characteristic; and associating the captured image and electronic audio signal.

19. The method of claim 18, wherein said step of associating is preformed by converting the electronic audio signal into image metadata and storing the image and the image metadata in association.

20. The method of claim 18, wherein the step of capturing an image comprises capturing a video signal and providing a still image based upon the video signal.

21. The method of claim 20, further comprising the steps of analyzing said audio signal and providing a still image based at least in part upon the analysis of the audio signal.

22. The method of claim 20, further comprising the step of capturing a set of high-resolution images and wherein the step of providing a still image comprises providing a still image this is generated based upon the captured still images and the captured video signal.

* * * * *